(12) United States Patent
Fang et al.

(10) Patent No.: US 11,214,685 B2
(45) Date of Patent: Jan. 4, 2022

(54) CURABLE ORGANOPOLYSILOXANE COMPOSITION AND CURED PRODUCT THEREOF

(71) Applicant: DOW SILICONES CORPORATION, Midland, MI (US)

(72) Inventors: Lei Fang, Shanghai (CN); Qi Chen, Shanghai (CN); Qiang Huang, Shanghai (CN); Yi Zhao, Shanghai (CN)

(73) Assignee: DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 16/632,358

(22) PCT Filed: Jul. 21, 2017

(86) PCT No.: PCT/CN2017/093821
§ 371 (c)(1),
(2) Date: Jan. 19, 2020

(87) PCT Pub. No.: WO2019/014915
PCT Pub. Date: Jan. 24, 2019

(65) Prior Publication Data
US 2020/0199363 A1    Jun. 25, 2020

(51) Int. Cl.
*C08L 83/04*    (2006.01)

(52) U.S. Cl.
CPC .......... *C08L 83/04* (2013.01); *C08L 2205/025* (2013.01); *C08L 2205/035* (2013.01)

(58) Field of Classification Search
CPC ........... C08L 83/12; C08L 83/06; C08L 83/04
See application file for complete search history.

(56) References Cited

U.S. PATENT DOCUMENTS

| | | | |
|---|---|---|---|
| 4,845,164 A | 7/1989 | Gutek | |
| 6,121,368 A | 9/2000 | Heying et al. | |
| 9,770,403 B2* | 9/2017 | Knoer | C08K 5/05 |
| 2008/0146709 A1 | 6/2008 | Aketa et al. | |
| 2008/0220675 A1 | 9/2008 | Ikeno et al. | |
| 2010/0069525 A1 | 3/2010 | Kamohara et al. | |
| 2010/0206470 A1* | 8/2010 | Chen | C08L 83/04 156/245 |
| 2011/0227235 A1* | 9/2011 | Yoshitake | C08L 83/04 257/791 |
| 2013/0190446 A1 | 7/2013 | Tan et al. | |
| 2015/0380636 A1 | 12/2015 | Fujisawa et al. | |
| 2016/0317427 A1* | 11/2016 | Knoer | A61Q 5/12 |

FOREIGN PATENT DOCUMENTS

| | | |
|---|---|---|
| CN | 1209153 A | 2/1999 |
| CN | 103619958 A | 3/2014 |
| CN | 103834356 A | 6/2014 |
| CN | 104981510 A | 10/2015 |
| CN | 106189258 A | 12/2016 |
| CN | 106398227 A | 2/2017 |
| EP | 0869156 A1 | 7/1998 |
| JP | S62240362 A | 10/1987 |
| JP | 2010070643 A | 4/2010 |
| JP | 2016169331 A | 9/2016 |
| KR | 20010050337 A | 6/2001 |
| KR | 20160007353 A | 1/2016 |
| TW | 201605982 A | 2/2016 |

OTHER PUBLICATIONS

English language translation KR 2016/0007353, Jan. 20, 2016.*
International Search Report for PCT/CN2017/093821 dated Apr. 19, 2018, 4 pages.
Machine assisted English translation of CN103834356A obtained from https://patents.google.com on Jan. 16, 2020, 10 pages.
Machine assisted English translation of KR20160007353A obtained from https://patents.google.com on Jan. 16, 2020, 13 pages.
Machine assisted English translation of TW201605982A obtained from https://patents.google.com on Jan. 16, 2020, 13 pages.
Machine assisted English translation of CN106189258A obtained from https://patents.google.com on Jan. 16, 2020, 11 pages.
Machine assisted English translation of CN106398227A obtained from https://patents.google.com on Jan. 16, 2020, 13 pages.
Machine assisted English translation of JP2016169331A obtained from https://wpr;dwode/espacenet.com on Jul. 2, 2021, 20 pages.

* cited by examiner

*Primary Examiner* — Margaret G Moore
(74) *Attorney, Agent, or Firm* — Warner Norcross + Judd LLP

(57) ABSTRACT

A curable organopolysiloxane composition is provided. The curable organopolysiloxane composition comprises: (A) a diorganopolysiloxane having at least two silicon-bonded alkenyl groups per molecule; (B) an organopolysiloxane resin; (C) a mixture of ($C_1$) a diorganopolysiloxane end-blocked with silicon-atom bonded hydrogen atoms at both molecular terminals and ($C_2$) an organohydrogenpolysiloxane having at least three silicon-bonded hydrogen atoms per molecule; (D) a polyether having at least one aliphatic unsaturated group per molecule; and (E) a hydrosilylation catalyst.

6 Claims, No Drawings

CURABLE ORGANOPOLYSILOXANE COMPOSITION AND CURED PRODUCT THEREOF

CROSS-REFERENCE TO RELATED APPLICATIONS

This application is the National Stage of International Appl. No. PCT/CN2017/093821 filed on 21 Jul. 2017, the content of which is hereby incorporated by reference.

TECHNICAL FIELD

The present invention relates to a curable organopolysiloxane composition and a cured produced thereof.

BACKGROUND ART

Curable organopolysiloxane compositions are widely employed in various industries due to their unique properties, which include excellent electrical insulation, excellent thermal stability, and excellent transparency. In particular, curable organopolysiloxane compositions are used to improve the visibility of displays such as smartphone, mobile phone, hand-held computer, and automotive navigation system.

However, due to gas-permeability of cured products obtained by curing the curable organopolysiloxane compositions, there are problems that the cured products in the displays become cloudy by environmental moisture.

In generally, one of approaches to controlling cloud of the cure product by environmental moisture is to improve hydrophilic property of the cured product by adding polyether polymer. For example, Korea Patent Application Publication No. 20160007353 discloses a curable organopolysiloxane composition comprising: an organopolysiloxane having at least 2 silicon-bonded alkenyl groups per molecule, an organohydrogenpolysiloxane having at least two silicon-bonded hydrogen atoms per molecule, an polyether having at least one aliphatic unsaturated bond per molecule, and a hydrosilylation reaction catalyst. However, the aforementioned composition is insufficient to produce a cured product having excellent transparency to improve visibility of the displays.

PRIOR ART DOCUMENTS

Patent Documents

Patent Document 1: Korea Patent Application Publication No. 20160007353

SUMMARY OF INVENTION

Technical Problem

An object of the present invention is to provide a curable organopolysiloxane composition which can cure to form an cured product having excellent cloud resistance by environmental moisture.

Solution to Problem

The curable organopolysiloxane composition of the present invention comprising:
(A) 100 parts by mass of a diorganopolysiloxane having at least two silicon-bonded alkenyl groups per molecule;
(B) 30 to 100 parts by mass of an organopolysiloxane resin consisting essentially of $R^1_3SiO_{1/2}$ units and $SiO_{4/2}$ units, wherein each $R^1$ is independently a monovalent hydrocarbon group, however, at least one $R^1$ per molecule is an alkenyl group, and a mole ratio of $R^1_3SiO_{1/2}$ units to $SiO_{4/2}$ units is from 0.6 to 1.7;
(C) a mixture of ($C_1$) a diorganopolysiloxane endblocked with silicon-atom bonded hydrogen atom at both molecular terminals and ($C_2$) an organohydrogenpolysiloxane having at least three silicon-bonded hydrogen atoms per molecule, in an amount sufficient to provide from 0.1 to 5 silicon-bonded hydrogen atoms per alkenyl group in components (A) and (B);
(D) a polyether having at least one aliphatic unsaturated group per molecule, in an amount of 0.15 to 0.45 mass % of the present composition; and
(E) a hydrosilylation catalyst, in an amount sufficient to cure the composition.

A mole ratio of silicon-bonded hydrogen atoms provided by component ($C_2$) per silicon-bonded hydrogen atoms provided by component ($C_1$) is preferably at least 2.

The curable organopolysiloxane composition may further comprises: (F) a hydrosilylation reaction inhibitor, in an amount sufficient to effect a pot-life of the composition.

The cured product of the present invention is characterized by being obtained by curing the curable organopolysiloxane composition.

Effects of Invention

Since the curable organopolysiloxane composition of the present invention is characterized by comprising polyether, the curable organopolysiloxane composition can cure to form an cured product having excellent cloud resistance by environmental moisture.

DETAILED DESCRIPTION OF THE INVENTION

The curable organopolysiloxane composition of the present invention will be explained in detail.

Component (A) must have at least two alkenyl groups with 2 to 12 carbon atoms in a molecule. The alkenyl groups are exemplified by vinyl groups, allyl groups, butenyl groups, pentenyl groups, and hexenyl groups, but vinyl groups are preferred from the perspective of economic efficiency and reactivity. Silicon-bonded groups other than alkenyl groups in component (A) are not limited, however, are exemplified by monovalent hydrocarbon groups with 1 to 12 carbon atoms free aliphatic unsaturated bond. The monovalent hydrocarbon groups are exemplified by methyl groups, ethyl groups, propyl groups, or similar alkyl group; phenyl groups, tolyl groups, xylyl groups, or similar aryl groups; benzyl groups, phenethyl groups, or similar aralkyl groups; and 3-chloropropyl groups, 3,3,3-trifluoropropyl groups, or similar halogenated alkyl groups, but methyl groups are preferred from the perspective of economic efficiency and heat resistance. Especially, at least 80 mol %, at least 90 mol %, or 100 mol % of silicon-bonded groups other than alkenyl groups in component (A) are preferably methyl groups.

The molecular structure of component (A) is straight chain, however, it may be partially branched. The viscosity at 25° C. of component (A) is not limited, however, it is preferably in a range of from 100 to 1,000,000 mPa s, in a range of from 100 to 100,000 mPa s, or in a range of from 100 to 10,000 mPa s.

Component (B) in the present composition is an organopolysiloxane which imparts tack to the cured pressure-sensitive adhesive. In the above formula for the siloxane units of component (B), each $R^1$ independently represents a monovalent hydrocarbon group with 1 to 12 carbon atoms. The monovalent hydrocarbon groups are exemplified by methyl groups, ethyl groups, propyl groups, or similar alkyl group; vinyl groups, allyl groups, butenyl groups, pentenyl groups, hexenyl groups, or similar alkenyl groups; phenyl groups, tolyl groups, xylyl groups, or similar aryl groups; benzyl groups, phenethyl groups, or similar aralkyl groups; and 3-chloropropyl groups, 3,3,3-trifluoropropyl groups, or similar halogenated alkyl groups. Preferably all of $R^1$ are methyl groups. Component (B) may have residual silanol groups which arise from the hydrolysis of reactive silanes that are used to prepare component (B).

The molar ratio of $R^1_3SiO_{1/2}$ units to $SiO_{4/2}$ units in component (B) falls within the range of 0.6 to 1.7, preferably within the range of 0.6 to 1.5. This is because when the molar ratio is greater than or equal to the lower limit of the aforementioned range, the compatibility with component (A) is improved, and when the molar ratio is less than or equal to the upper limit of the aforementioned range, the mechanical strength of the cured product is improved.

Methods for synthesizing such organopolysiloxanes are known. The disclosures of U.S. Pat. Nos. 2,676,182 and 3,284,406 are incorporated herein by reference to show the preparation of organopolysiloxanes which are suitable as component (B) in the present composition.

Component (B) is added in an amount of form 30 to 100 parts by mass, preferably from 40 to 90 parts by mass, or from 50 to 90 parts by mass, per 100 parts by mass of component (A). This is because when the content of component (B) is greater than or equal to the lower limit of the aforementioned range, the mechanical strength of the cured product is improved, and when the content of component (B) is less than or equal to the upper limit of the aforementioned range, the transparency of the cured product is improved.

Component (C) in the present composition is the component which functions as the crosslinker curing agent, and is a mixture of ($C_1$) a diorganopolysiloxane endblocked with silicon-atom bonded hydrogen atom at both molecular terminals and ($C_2$) an organohydrogenpolysiloxane having at least three silicon-bonded hydrogen atoms per molecule.

Component ($C_1$) is a diorganopolysiloxane endblocked with silicon-atom bonded hydrogen atom at both molecular terminals. Silicon-bonded groups other than hydrogen atoms in component ($C_1$) may be monovalent hydrocarbon groups free aliphatic unsaturated bond. The monovalent hydrocarbon groups are exemplified by methyl groups, ethyl groups, propyl groups, or similar alkyl group; phenyl groups, tolyl groups, xylyl groups, or similar aryl groups; benzyl groups, phenethyl groups, or similar aralkyl groups; and 3-chloropropyl groups, 3,3,3-trifluoropropyl groups, or similar halogenated alkyl groups, but methyl groups are preferred from the perspective of economic efficiency and heat resistance. Especially, at least 80 mol %, at least 90 mol %, or 100 mol % of silicon-bonded groups other than hydrogen atoms in component ($C_1$) are preferably methyl groups.

Component ($C_2$) is an organohydrogenpolysiloxane having at least three silicon-bonded hydrogen atoms per molecule. The molecular structure of component ($C_2$) is not limited and can be cyclic, linear, branched and/or network, as desired. Silicon-bonded groups other than hydrogen atoms may be monovalent hydrocarbon groups free aliphatic unsaturated bond. The monovalent hydrocarbon groups are exemplified by methyl groups, ethyl groups, propyl groups, or similar alkyl group; phenyl groups, tolyl groups, xylyl groups, or similar aryl groups; benzyl groups, phenethyl groups, or similar aralkyl groups; and 3-chloropropyl groups, 3,3,3-trifluoropropyl groups, or similar halogenated alkyl groups, but methyl groups are preferred from the perspective of economic efficiency and heat resistance. Especially, at least 80 mol %, at least 90 mol %, or 100 mol % of silicon-bonded groups other than hydrogen atoms in component ($C_2$) are preferably methyl groups.

The content of component ($C_2$) in component (C) is not limited, but it is desirable that a mole ratio of silicon-bonded hydrogen atoms provided by component ($C_2$) per silicon-bonded hydrogen atoms provided by component ($C_1$) is at least 2.

The quantity of component (C) is sufficient to provide from 0.1 to 5 silicon-bonded hydrogen atoms per the alkenyl group in component (A), and preferably from 0.1 to 3 silicon-bonded hydrogen atoms, or from 0.5 to 3 silicone-bonded hydrogen atoms. This is because when the content of component (C) is within the aforementioned range, the present composition can be cured sufficiently.

Component (D) is a polyether to provide the cured product of the present composition with excellent cloud resistance by environmental moisture. Component (D) has at least one aliphatic unsaturated group per molecule. The aliphatic unsaturated groups are exemplified by alkenyl groups with 2 to 12 carbon atoms such as vinyl groups, allyl groups, butenyl groups, pentenyl groups, hexenyl groups and the like; alkynyl groups with 2 to 12 carbon atoms such as ethynyl groups, propynyl groups, butynyl groups, pentynyl groups, hexynyl groups and the like.

Component (D) may be represented by the following average formula:

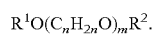

$R^1O(C_nH_{2n}O)_mR^2$.

In the formula, "n" is an integer of from 2 to 4, preferably 2 or 3. Component (D) may comprise oxyethylene units —($C_2H_4O$)—, oxypropylene units —($C_3H_6O$)—, oxybutylene units —($C_4H_8O$)—, or mixtures thereof. The oxyalkylene units can be arranged in any fashion to form either a block or randomized copolymer structure, but typically form a randomized copolymer group. Typically, the polyoxyalkylene comprises both oxyethylene units ($C_2H_4O$) and oxypropylene units ($C_3H_6O$) in a randomized copolymer.

In the formula, "m" is a positive number of greater than 2, preferably a number of from 2 to 100.

In the formula, $R^1$ is an aliphatic unsaturated group with 2 to 12 carbon atoms. The aliphatic unsaturated groups are exemplified by alkenyl groups with 2 to 12 carbon atoms such as vinyl groups, allyl groups, butenyl groups, pentenyl groups, hexenyl groups and the like; alkynyl groups with 2 to 12 carbon atoms such as ethynyl groups, propynyl groups, butynyl groups, pentynyl groups, hexynyl groups and the like.

In the formula, $R^2$ is $R^1$, hydrogen, an acetyl group, or a monovalent hydrocarbon group with 1 to 8 carbon atoms. The monovalent hydrocarbon group of $R^2$ are exemplified by methyl groups, ethyl groups, propyl groups, or similar alkyl group; phenyl groups, tolyl groups, xylyl groups, or similar aryl groups; benzyl groups, phenethyl groups, or similar aralkyl groups; and 3-chloropropyl groups, 3,3,3-trifluoropropyl groups, or similar halogenated alkyl groups. $R^2$ is preferably a hydrogen.

Component (D) are known in the art, and many are commercially available. Representative, non-limiting examples of polyethers, having an aliphatic unsaturated group, useful as component (D) include;

CH$_2$=CHCH$_2$O(C$_2$H$_4$O)$_a$H
CH$_2$=CHCH$_2$O(C$_2$H$_4$O)$_a$CH$_3$
CH$_2$=CHCH$_2$O(C$_2$H$_4$O)$_a$C(O)CH$_3$
CH$_2$=CHCH$_2$O(C$_2$H$_4$O)$_a$(C$_3$H$_6$O)$_b$H
CH$_2$=CHCH$_2$O(C$_2$H$_4$O)$_a$(C$_3$H$_6$O)$_b$CH$_3$
CH$_2$=CHCH$_2$O(C$_2$H$_4$O)$_a$C(O)CH$_3$
CH$_2$=C(CH$_3$)CH$_2$O(C$_2$H$_4$O)$_a$H
CH$_2$=CC(CH$_3$)$_2$O(C$_2$H$_4$O)$_a$H
CH$_2$=C(CH$_3$)CH$_2$O(C$_2$H$_4$O)$_a$CH$_3$
CH$_2$=C(CH$_3$)CH$_2$O(C$_2$H$_4$O)$_a$C(O)CH$_3$
CH$_2$=C(CH$_3$)CH$_2$O(C$_2$H$_4$O)$_a$(C$_3$H$_6$O)$_b$H
CH$_2$=C(CH$_3$)CH$_2$O(C$_2$H$_4$O)$_a$(C$_3$H$_6$O)$_b$CH$_3$
CH$_2$=C(CH$_3$)CH$_2$O(C$_2$H$_4$O)$_a$C(O)CH$_3$
CH≡CCH$_2$O(C$_2$H$_4$O)$_a$H
CH≡CCH$_2$O(C$_2$H$_4$O)$_a$CH$_3$
CH≡CCH$_2$O(C$_2$H$_4$O)$_a$C(O)CH$_3$
CH≡CCH$_2$O(C$_2$H$_4$O)$_a$(C$_3$H$_6$O)$_b$H
CH≡CCH$_2$O(C$_2$H$_4$O)$_a$(C$_3$H$_6$O)$_b$CH$_3$
CH≡CCH$_2$O(C$_2$H$_4$O)$_a$C(O)CH$_3$
wherein "a" and "b" are greater than 0, alternatively "a" and "b" independently may range from 0 to 40, with the proviso that a+b>2.

The quantity of component (D) is in an amount of 0.15 to 0.45 mass %, preferably, 0.20 to 0.40 mass %, or 0.20 to 0.35 mass % of the present composition. This is because when the content of component (D) is greater than or equal to the lower limit of the aforementioned range, the cloud resistance of the cured product is improved, and when the content of component (D) is less than or equal to the upper limit of the aforementioned range, the transparency of the cured product is improved.

Component (E) is a platinum-containing catalyst, and it promotes the addition reaction of component (A) with component (C). Component (D) is exemplified by chloroplatinic acid, chloroplatinic acid-olefin complexes, chloroplatinic acid-vinylsiloxane complexes, and platinum supported on a microparticulate carrier such as alumina.

Component (E) is added in a quantity sufficient to enhance a hydrosilylation reaction of the present composition, and preferable in a quantity sufficient to give from 0.1 to 1000, and preferably 1 to 300, parts by mass of platinum for every one million parts by mass of the combined quantity of components (A) through (C). The crosslinking reaction will be unsatisfactory at below 0.1 part by mass, and the cohesive strength will thus be reduced, while exceeding 1,000 parts by mass is disadvantageous due to the resulting short use time and high cost.

In addition to components (A) through (E), an inhibitor (F) known in the art may be added to the present composition. Component (F) is exemplified by 3-methyl-1-butyn-3-ol, 3,5-dimethyl-1-hexyn-3-ol, 3-methyl-1-pentyn-3-ol, 1-ethynyl-1-cyclohexanol, 3-phenyl-1-butyn-3-ol, or a similar alkyne alcohol; 3-methyl-3-penten-1-yne, 3,5-dimethyl-1-hexen-3-yne, or a similar en-yne compound; 1,3,5,7-tetramethyl-1,3,5,7-tetravinylcyclotetrasiloxane, 1,3,5,7-tetramethyl-1,3,5,7-tetrahexenylcyclotetrasiloxane, or a similar methylalkenylsiloxane compound; alkyl and substituted alkyl maleates, or similar unsaturated ester; or benzotriazole. The content of component (F) may be in an amount of 0.001 to 5 part by mass per 100 parts by mass of components (A) and (B).

Furthermore, the addition of small quantities of supplementary components to the present composition is permissible. Such supplementary components are, for example, the various antioxidants, pigments, stabilizers, fillers, etc.

EXAMPLES

The curable organopolysiloxane composition of the present invention will be described in detail hereinafter using Practical Example and Comparative Examples. However, the present invention is not limited by the description of the below listed Practical Examples. Viscosities were measured at 25° C.

Practical Example 1 and Comparative Examples 1-3

The curable organopolysiloxane compositions shown in Table 1 were prepared using the components mentioned below. Moreover, in Table 1, "SiH/Vi" represents the total moles of silicon-bonded hydrogen atoms in component (C) per 1 mole of total vinyl groups in components (A) and (B).

The following component was used as component (A).
Component (a-1): a dimethylpolysiloxane capped at both molecular terminals with dimethylvinylsiloxy groups and having a viscosity of 2,000 mPa·s (content of vinyl groups: 0.23 mass %)

The following component was used as component (B).
Component (b-1): an organopolysiloxane resin represented by the following average unit formula:

$$[(CH_2=CH)(CH_3)_2SiO_{1/2}]_{0.05}[(CH_3)_3SiO_{1/2}]_{0.37}(SiO_{4/2})_{0.58},$$

and having a content of vinyl groups: 1.64 mass %

The following components were used as component (C).
Component (c-1): a dimethylpolysiloxane capped at both molecular terminals with dimethylhydrogensiloxy groups and having a viscosity of 10 mPa·s, and having a content of silicon-bonded hydrogen atoms: 0.13 mass %
Component (c-2): a dimethylsiloxane-methylhydrogensiloxane copolymer capped at both molecular terminals with trimethylsiloxy groups and having a viscosity of 5 mPa·s, and having a content of silicon-bonded hydrogen atoms: 0.76 mass %

The following component was used as component (D).
Component (d-1): polyether represented by the following formula:

$$CH_2=CHCH_2O(C_2H_4O)_{12}H$$

The following component was used as component (E).
Component (e-1): 1,3-divinyl-1,1,3,3-tetramethyldisiloxane solution of platinum-1,3-divinyl-1,1,3,3-tetramethyldisiloxane complex (platinum metal content=approximately 6,000 ppm by mass)

The following component was used as component (F).
Component (f-1): tetramethyltetravinylcyclotetrasiloxane The properties reported in the Examples were measured by the following method.

[Transmittance, Clarity and Haze of Cured Product]
A curable organopolysiloxane composition was cured at 80° C. for 1 hr., to produce a 0.2 mm-thick sheet-shaped cured product. Then, transmittance, clarity and haze of the sheet-shaped cured product was measured before and after aging in an environment at 85° C. and 85% RH for 1000 hrs. by means of hazemeter (Haze-Grad plus produced by BYK-Gardner GmbH) according to the method stipulated in ASTM D1003.

[Appearance of Cured Product after Aging]
A curable organopolysiloxane composition was cured at 80° C. for 1 hrs., to produce a 1-mm-thick sheet-shaped cured product. Then, appearance of the cured product after aging in an environment at 85° C. and 85% RH for 1000 hrs. was observed by naked-eye.

TABLE 1

| | | | Prac. Exam. 1 | Comp. Exam. 1 | Comp. Exam. 2 | Comp. Exam. 3 |
|---|---|---|---|---|---|---|
| Curable Organopolysiloxane Composition (parts by mass) | (A) | (a-1) | 105.5 | 105.5 | 105.5 | 105.5 |
| | (B) | (b-1) | 82.9 | 82.9 | 82.9 | 82.9 |
| | (C) | (c-1) | 7.6 | 7.6 | 7.6 | 7.6 |
| | | (c-2) | 3.3 | 3.3 | 3.3 | 3.3 |
| | (D) | (d-1) | 0.5 | — | 0.2 | 1.0 |
| | (E) | (e-2) | 0.26 | 0.26 | 0.26 | 0.26 |
| | (F) | (f-1) | 0.36 | 0.36 | 0.36 | 0.36 |
| SiH/Vi | | | 0.6 | 0.6 | 0.6 | 0.6 |
| Transmittance | Before aging | | 93.7 | 93.8 | 93.7 | 93.3 |
| | After aging | | 94.0 | 93.4 | 93.4 | 93.6 |
| Clarity | Before aging | | 100 | 100 | 100 | 99.4 |
| | After aging | | 100 | 98.2 | 99.7 | 99.5 |
| Haze | Before aging | | 1.89 | 0.56 | 0.72 | 13.8 |
| | After aging | | 0.83 | 1.86 | 2.52 | 7.09 |
| Appearance | | | Non-Hazy | Hazy | Hazy | Hazy |

INDUSTRIAL APPLICABILITY

The curable organopolysiloxane composition of the present invention is useful in adhesive, encapsulating agent, or filling agent for displays such as smartphone, mobile phone, hand-held computer, and automotive navigation system.

The invention claimed is:

1. A curable organopolysiloxane composition comprising:
   (A) 100 parts by mass of a diorganopolysiloxane having at least two silicon-bonded alkenyl groups per molecule, wherein at least 90 mol % of silicon-bonded groups in component (A) other than alkenyl groups in component (A) are methyl groups;
   (B) 30 to 100 parts by mass of an organopolysiloxane resin consisting essentially of $R^1_3SiO_{1/2}$ units and $SiO_{4/2}$ units, wherein each $R^1$ is independently a monovalent hydrocarbon group, however, at least one $R^1$ per molecule is an alkenyl group, and a mole ratio of $R^1_3SiO_{1/2}$ units to $SiO_{4/2}$ units is from 0.6 to 1.7;
   (C) a mixture of
      ($C_1$) a diorganopolysiloxane endblocked with silicon-atom bonded hydrogen atoms at both molecular terminals and
      ($C_2$) an organohydrogenpolysiloxane having at least three silicon-bonded hydrogen atoms per molecule,
   in an amount sufficient to provide from 0.1 to 5 silicon-bonded hydrogen atoms per alkenyl group in components (A) and (B);
   (D) a polyether having at least one aliphatic unsaturated group per molecule, in an amount of 0.20 to 0.40 mass % of the composition; and
   (E) a hydrosilylation catalyst, in an amount sufficient to cure the composition.

2. The curable organopolysiloxane composition according to claim 1, wherein a mole ratio of silicon-bonded hydrogen atoms provided by component ($C_2$) per silicon-bonded hydrogen atoms provided by component ($C_1$) is at least 2.

3. The curable organopolysiloxane composition according to claim 1, further comprising:
   (F) a hydrosilylation reaction inhibitor, in an amount sufficient to effect a pot-life of the composition.

4. A cured product obtained by curing the curable organopolysiloxane composition according to claim 1.

5. The curable organopolysiloxane composition according to claim 1, wherein all silicon-bonded groups other than alkenyl groups in component (A) are methyl groups.

6. The curable organopolysiloxane composition according to claim 1, wherein component (D) is present in an amount of from 0.20 to 0.35 mass % of the composition.

* * * * *